Figure 1:
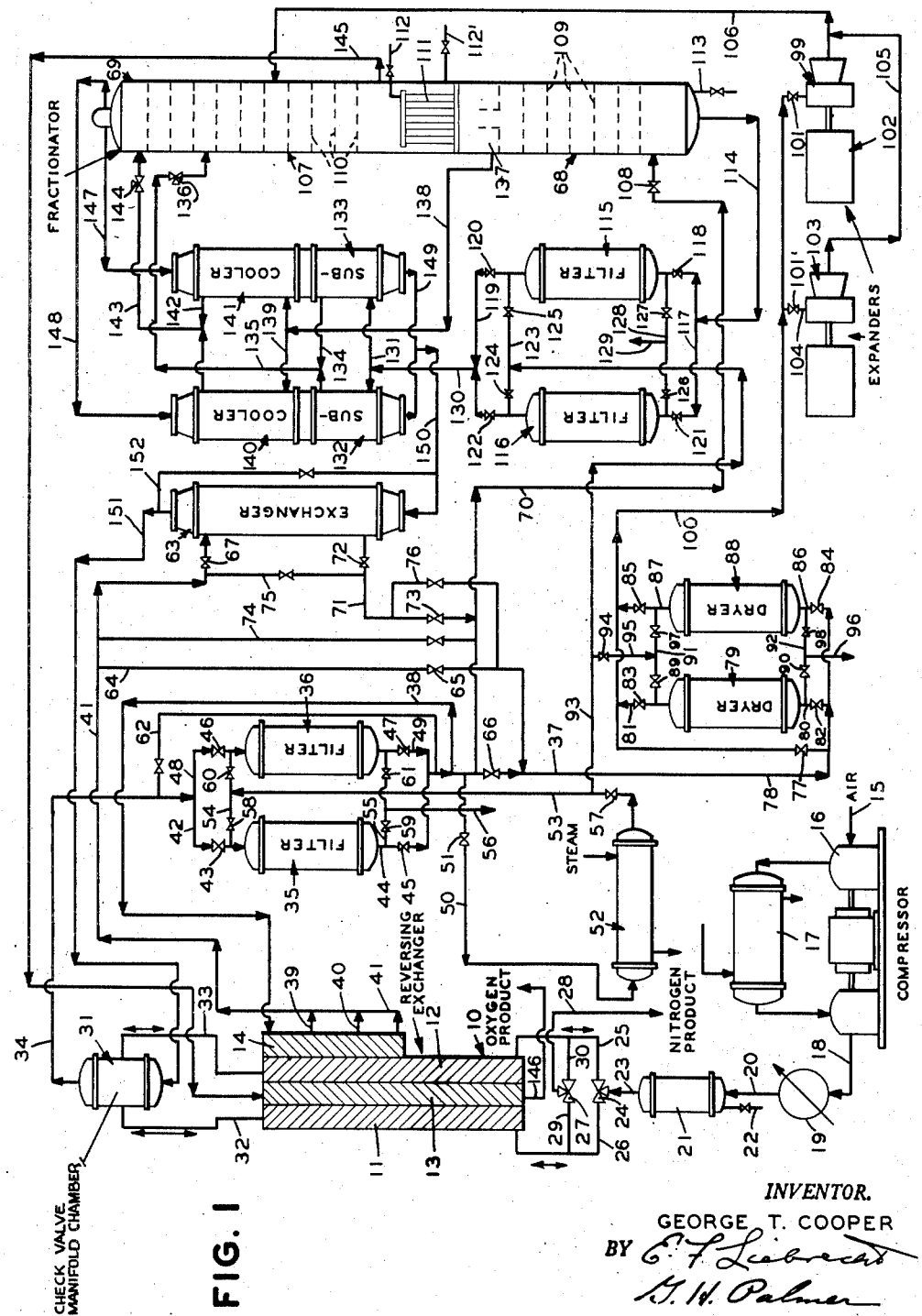

Sept. 1, 1953

G. T. COOPER 2,650,481

SEPARATION OF GASEOUS MIXTURES

Filed Jan. 27, 1948

3 Sheets-Sheet 1

INVENTOR.
GEORGE T. COOPER
BY
ATTORNEYS

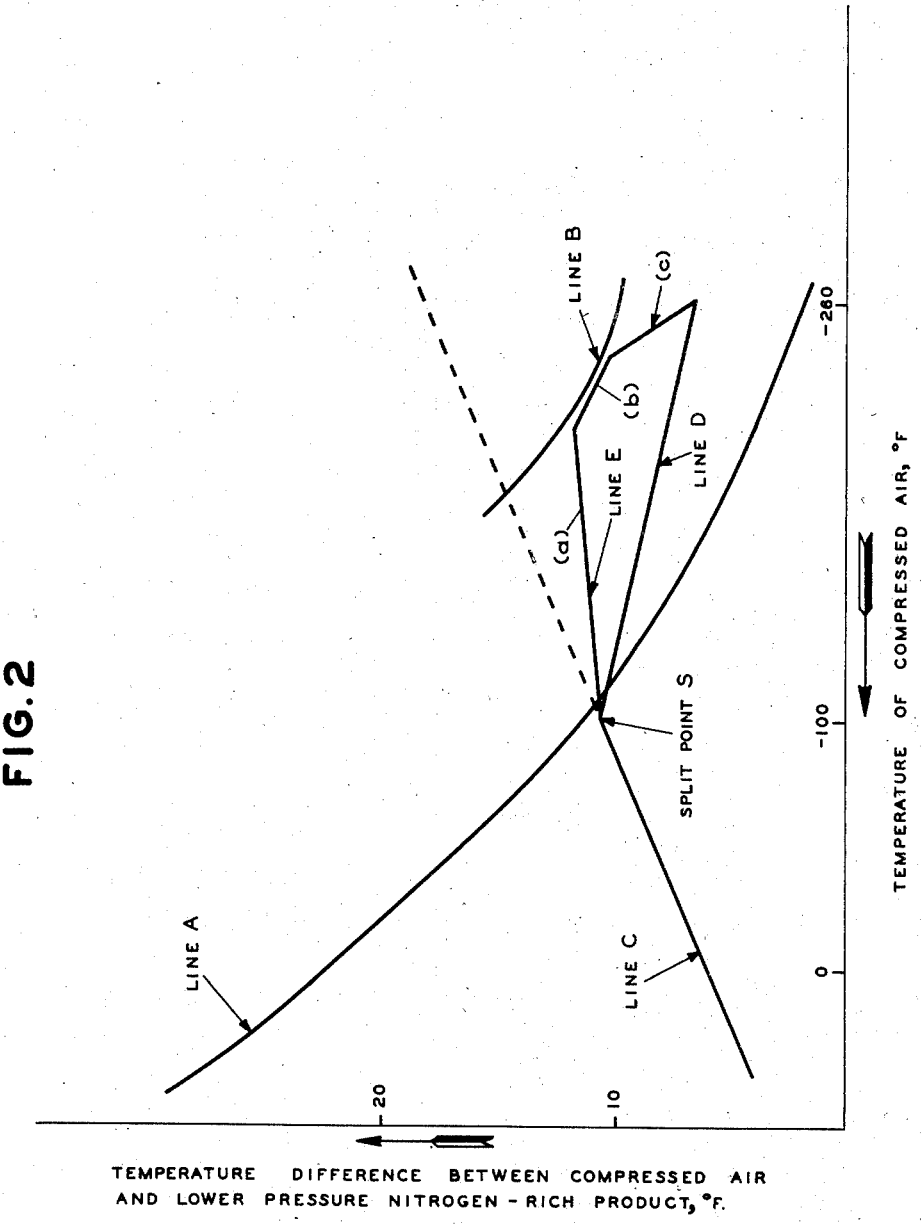

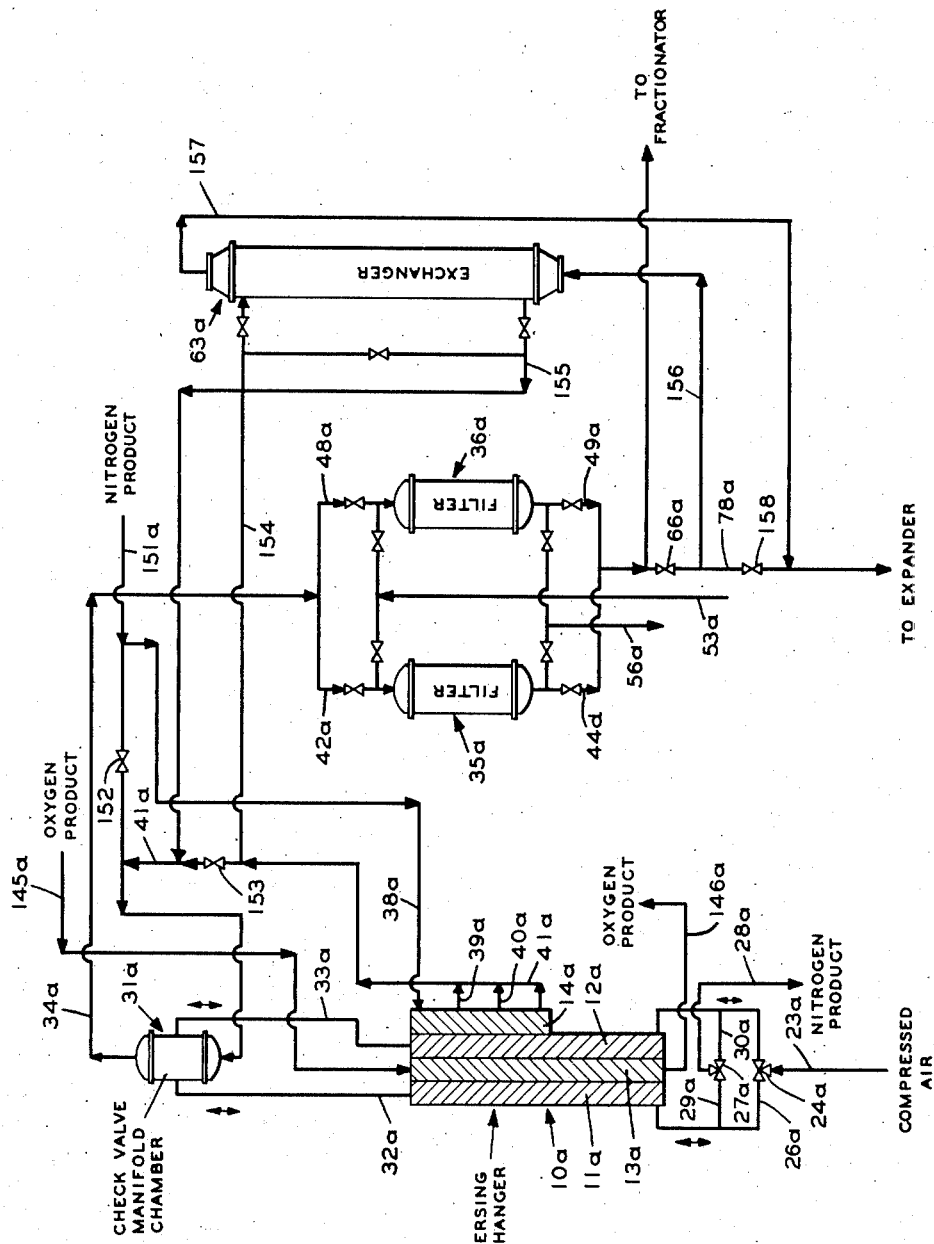

Patented Sept. 1, 1953

2,650,481

UNITED STATES PATENT OFFICE 2,650,481

SEPARATION OF GASEOUS MIXTURES

George T. Cooper, Clifton, N. J., assignor to The M. W. Kellogg Company, Jersey City, N. J., a corporation of Delaware Application January 27, 1948, Serial No. 4,597

11 Claims. (Cl. 62—175.5)

This invention relates to improvements in the separation of gaseous mixtures by liquefaction and fractionation. More particularly, the invention relates to low temperature gas separations in which compressed gas mixtures are cooled in reversing heat exchange zones by backward-returning cold gaseous products. Still more particularly, the invention relates to reversing heat exchange zones that provide for "unbalance" heat exchange relationship between the incoming compressed gaseous feed and outgoing cold gaseous product.

Broadly, the present invention is concerned with the method of separating a gaseous mixture wherein a compressed gaseous stream of the mixture is passed in one direction of flow through a reversing heat exchange zone along a path therein progressively decreasing in temperature from end to end to effect cooling of the stream and resultant precipitation of at least one component of higher boiling point in a colder portion of the path, wherein a second gaseous stream, obtained from the gaseous mixture after the precipitation, is passed subsequently at a lower temperature than the colder portion through the same path in the opposite direction of flow after the first stream has ceased flow therethrough, and wherein the temperature of the colder portion of the path is controlled by passing a gaseous stream, obtained after the precipitation of the component of higher boiling point from the gaseous mixture, through a separate path in the heat exchange zone disposed in heat exchange relation with at least a part of the colder portion of the first-mentioned path.

Reversing heat exchange zones have been employed for cooling the feed in processes for the separation of gaseous mixtures by liquefaction and fractionation and when thus employed have had the additional function of removing certain higher boiling impurities. For example, in the separation of atmospheric air water vapor, carbon dioxide, and other vaporized impurities, such as hydrocarbons, are removed as the air is cooled to low temperatures by a reversing heat exchange relationship with cold gaseous components derived from its subsequent separation. The impurities are precipitated and deposited in the reversing heat exchange zone while the air is undergoing cooling in a passageway during one phase of a reversing cycle. The deposits subsequently are removed by the evaporative action of cold vaporous product flowing through the same passageway during the "reversed" phase of the cycle after the flow of air therethrough has ceased. However, the complete removal of the precipitated deposits has required the regulation of operating conditions in colder portions of the reversing heat exchange zone where alternate precipitation and evaporation takes place. It has been essential to regulate, for instance, the temperature of the incoming compressed air and/or the temperature of the evaporative cold vaporous product so as to keep them sufficiently close to each other in the zone of alternate precipitation and evaporation. A method for effecting close temperature differences is described by Paul R. Trumpler in his application Serial No. 533,608, filed May 1, 1944, now Patent 2,460,859. Pursuant to this method the proper temperature relationship between the incoming compressed air and cold vaporous product is obtained by an "unbalance" heat exchange. The unbalance is effected by affecting the heat exchange in a region of alternate precipitation and evaporation by means of a separate stream which may be a portion of the cold compressed air, or by a portion of cold vaporous product or by separate streams of both of these materials.

It is the principal object of this invention to provide a method for accomplishing an improved unbalance heat exchange with the resultant effect that a desirable and controlled temperature difference between the compressed air and cold vaporous product is maintained throughout the length of a region of alternate precipitation and evaporation with less heat exchange surface.

In its preferred embodiment the invention involves, as an important step, the successive withdrawal of portions of the vaporous material flowing in the separate stream, or streams, employed to effect the unbalance heat exchange. In the following detailed description of the invention, reference will be made to atmospheric air as illustrative of a gaseous mixture, in the separation of which the present invention is applicable. It is to be understood, however, that the invention is applicable to the separation of other gaseous mixtures containing undesired higher boiling components, as for example, low molecular weight hydrocarbons. The method for affecting the temperature difference between the incoming compressed air and outgoing cold vaporous product in a region of alternate precipitation and evaporation by an improved unbalance heat exchange, will be described by referring to the accompanying drawing in which Figure 1 is a diagrammatic representation in elevation of an arrange of apparatus adapted to carry out the invention in a process for the separation of atmospheric air into its oxygen-rich and nitrogen-rich components by liquefaction and fractionation at low temperatures and relatively moderate superatmospheric pressures. According to the embodiment of the invention illustrated by this figure a portion of the compressed air, after passage through the exchanger, is utilized as the separate gaseous stream of passage through the separate path. Part of this stream is withdrawn intermediate the inlet and outlet points thereof to obtain an improved unbalanced heat exchange required for decreasing undesirably large and inoperable temperature differences between the reversing streams in the cold end of the exchanger.

Figure 2 illustrates graphically the temperature differences between air and nitrogen-rich product obtained with the process conditions of Figure 1 in relationship with theoretical temperature differences required for water and carbon dioxide removal by a gaseous evaporating stream.

Figure 3 illustrates an alternative embodiment of the invention which involves utilization of a portion of nitrogen-rich product, passing to the reversing heat exchanger, as the separate gaseous stream for passage through the separate path. Part of this stream is withdrawn intermediate the inlet and outlet points thereof to obtain an improved unbalanced heat exchange required for decreasing undesirably large and inoperable temperature differences between the reversing streams at the cold end of the exchanger.

Referring now to the drawing, an important function in the processing arrangement shown by this drawing is performed in the reversing heat exchanger 10, which provides the reversing heat exchange zone for cooling compressed feed air by countercurrent heat exchange with the vaporous cold streams of the oxygen-rich and nitrogen-rich output products, or components, resulting from the separation of the air. While the principal effect of the heat exchange in reversing exchanger 10 is the cooling of the compressed air, the exchanger also serves as a zone of purification. This is, water and carbon dioxide, constitutents that usually are associated with atmospheric air drawn as feed into separation processes of this type, are precipitated from the cooled air and left as liquid or solid deposits on the metallic surfaces of the exchanger. Thus, it is not only cooled but purified air that subsequently leaves the exchanger.

Exchanger 10 is a multi-stream arrangement comprising four passageways for the flow of air, the oxygen-rich, nitrogen-rich products, and a separate stream of vaporous material which may be either a part of the cooled effluent air from the exchanger or a part of the nitrogen-rich product removed from the main stream of this product before the introduction thereof into the exchanger. Passageways 11 and 12 of the exchanger are "reversing" passages which alternately carry compressed air and nitrogen-rich product in countercurrent heat exchange relationship with each other. These passageways are similar in flow resistance and extend the whole length of exchanger 10. Passageway 13, carrying the oxygen-rich product, countercurrently to the flow of the compressed air likewise extends over the whole length of the exchanger, but the fourth passageway 14, frequently called the "unbalance passage" because additional heat exchange is effected by the material carried therethrough generally is shorter and usually is incorporated only into the colder portions of the exchanger. In the drawing exchanger 10 is shown to diagrammatically represent in sectional elevation a rectangular heat exchanger constructed of rectangularly shaped passageways. This particular construction of the exchanger is not essential as other forms of construction are just as applicable to the performance of the function of this apparatus. It is desirable, however, that the two similar passageways 11 and 12 which are employed for "reversing" be packed with a metallic material and for efficient thermal flow the remaining passageways should be packed similarly. The packing material may be of any suitable character and conveniently may consist of a multiplicity of closely spaced pins, coils of edge wound metallic ribbon, longitudinally placed strips of metal or the like. In order to provide for a greater thermal efficiency it is preferable that the metallic packing be affixed to the walls of the passageways with a suitable metal to metal bonding material, for example, solder. In the event that the individual passageways of the exchanger do not have common boundary walls of the type shown in the drawing, such as for the case where the passageways consist of separate tubular conduits, it is preferable also to bond the passageways into an integral unit. Further, it is to be understood that although heat exchanger 10 is shown in the drawing to diagrammatically represent a countercurrent heat exchange vessel, the invention is not limited to this type of heat exchange zone since it is equally applicable to processing arrangements involving the use of regenerative type vessels. Furthermore, separate heat exchange vessels may be employed for exchanging heat between separate portions of the compressed air and each of the product streams.

In the operation of heat exchanger 10 a stream of atmospheric air, desirably filtered to remove solid particles such as dust, is introduced into the system through line 15 into a two stage compressor 16. The air is compressed first to an intermediate pressure in the first stage and, after having the heat of this compression removed in inter-cooler 17, is finally compressed to about 92 pounds per square inch gauge in the second stage of compression. At this increased pressure the air leaves compressor 16 through the line 18 at a temperature of about 300° F. In order to reduce operating difficulties at subsequent steps in the process, it may be desirable to treat the air chemically at this point to remove any small trace of hydrocarbons, particularly acetylene, which is very likely to be present in atmospheric air. While this chemical treatment may be accomplished in any desired manner, it is conveniently carried out for acetylene removal according to a method, not shown on the drawing, whereby the warm air coming directly from the compressor is subjected to the catalytic action of a suitable catalyst as, for example, one containing a mixture of copper and manganese oxides. If necessary, a suitable filter may be inserted in the line between the compressor and the chemical treating step to remove any hydrocarbon oil entrained in the air from the compressor. In any event the compressed air eventually is cooled in aftercooler 19 by cooling water and then passed by way of line 20 into and through separator 21 for separation of the water vapor condensed in aftercooler 19. The water thus separated is removed by valved line 22. After this, the air passes through line 23 to exchanger 10 at 90° F. and about 90 pounds per square inch gauge by way of valve 24 and either line 25 or line 26, friction drop in the lines and vessels having caused the small loss of pressure.

To direct the flow of the incoming compressed feed air alternating into line 25 and line 26 at frequent periodic intervals of time, usually of about 3 minutes duration, the construction of valve 24 is of the "reversing" type. Valve 24 has a single inlet, opening to the flow of the incoming air, and two outlet openings, one leading to line 25 and the other leading into line 26, with suitable internal construction and mechanism to direct the flowing air into either one of the two outlet connecting lines. Both valve 24 and its companion valve 27 are shown in the drawing to diagrammatically represent a reversing type valve, no attempt being made to illustrate any actual construction of the valve arrangement as such is not essential to this description. Preferably, valve 24 is operated periodically by an automatic timing device so that the valve settings are automatically changed to divert the compressed air alternately into line 25 or line 26 at the desired intervals of time. Reversing valve 27 is mechanically arranged to cooperate simultaneously with the action of valve 24 since it is the function of this valve to direct the flow of the backward-returning nitrogen-rich product, also passing alternately through lines 26 and 25, from these lines to the single outlet line 28 by way of connecting lines 29 and 30.

The incoming compressed air passes alternately from lines 25 and 26 into the warm end of either passageway 11 or 12 of exchanger 10 and, in passing therethrough, is cooled in counter-flow heat relation with the cold products of the separation, particularly with the nitrogen-rich product being passed alternately through these same two passageways since this latter product is predominant. As the compressed air is cooled in exchanger 10, water, first as liquid then as ice, and subsequently carbon dioxide as a solid are precipitated from the air and deposited in the exchanger. Were the flow of compressed air and nitrogen-rich product not interchanged through the passageways 11 and 12, the accumulation of solid carbon dioxide, and/or water-ice, would block the exchanger. However, reversing valves 24 and 27 frequently and periodically divert the air into the alternate passageway which has been carrying the nitrogen-rich product and this change in flow causes the check valves within the check valve manifold chamber 31 to respond suitably so that the nitrogen-rich product is immediately switched from the passageway through which it has been flowing into the passageway that has just been employed for cooling the air. The streams of gaseous material in either reversing passageway thus are interchanged periodically by valves 24, 27, and 31 before any substantial amount of water or carbon dioxide has been deposited from the air, but the flow of each stream is always in the same direction. Because these two streams are in counter-flow, the direction of gas flow, relative to these deposited impurities, is reversed by the action of the valves and in consequence of this fact exchanger 10 is called "reversing exchanger" and passageways 11 and 12 are generally designated "reversing passageways."

Since, the nitrogen-rich product stream not only is utilized to abstract heat from the incoming compressed air but is employed also to evaporate and remove the impurities from the reversing heat exchange zone that have been deposited therein as the result of the temperature reduction procedure, it may be considered a "scavenging stream" as well as a cooling medium. Inasmuch as this stream is a resultant product of the separation of air after the air has been expanded, it is at a lower pressure than the incoming stream of compressed air with which it is exchanging heat in the reversing passageways and consequently the capacity of the nitrogen-rich product stream to hold water or carbon dioxide in the vapor state is greater than is the capacity of the compressed air stream to do this at the same temperature. Therefore, the former stream as it passes over the deposits left by the compressed air in the exchanger, is more capable of evaporating such deposits and carrying them out of the exchanger. The air thus leaves passageways 11 or 12 by way of lines 32 or 33 respectively in a cold and purified condition. Because the nitrogen-rich product stream evaporates and removes deposited material from the exchanger in this manner, the foregoing cycle should be capable of being repeated indefinitely. However, in practice to be able to operate exchanger 10 to remove precipitated deposits completely, it is necessary to establish actual operating conditions which will insure complete evaporation of such deposits. Without attempting to discuss the complete theory on which the operation of the reversing heat exchanger is based, since such discussion would include theoretical evaluation of the rate of deposition of impurities and the rate of evaporation, a simple but useful explanation for the actual operation of the exchanger and the application of "unbalance" heat exchange now will be described. For this explanation, a simplifying assumption is made to the effect that the gases at any point in the exchanger are saturated and that the rates of evaporation and deposition are sufficiently high to be of no concern.

It is evident that exchanger 10 will maintain itself free of accumulation of deposited impurities if, at all points along the length of the exchanger, the amount of the impurity moving toward the cold end in the compressed air stream is equal to the amount of impurity moving toward the warm end in the nitrogen-rich product stream. In other words, it is necessary that there should be a material balance on the impurities entering and leaving any section of the exchanger if there is to be no accumulation of impurity in that section. For the purpose of this description the amount of impurities in the cooled compressed air leaving the exchanger, being substantially negligible are neglected, and in view of this the amount of impurity entering any given section of the exchanger can be determined from the flow rate of the compressed air, the pressure of the air and the temperature of the air in accordance with the aforementioned assumption that the air is saturated at its temperature as it enters said section under consideration. To complete the material balance the same quantity of impurity must be contained in the nitrogen-rich product stream whose flow rate and pressure are known. From these facts the actual concentration of impurity in the nitrogen-rich product is determined and since the pressure of this product is known and since it is to be assumed that this product is saturated with impurity, it is thus possible to calculate the temperature at which the nitrogen-rich product is saturated with the vapors of the impurity. The difference between this calculated temperature of the saturated nitrogen-rich product and the corresponding temperature of the compressed air is a theoretical critical value since it is the maximum difference in temperature between the two gaseous streams at which complete evaporation of the precipitated impurities may be completed. That is, if the temperature of the nitrogen-rich product is lower than the aforementioned saturation temperature and thereby causes a temperature difference greater than this maximum, this product will be too cold to evaporate all the impurities and the latter will accumulate in the exchanger.

The above mentioned critical temperature difference is affected also by the pressure ratio of the compressed air and the nitrogen-rich product streams. For example, a decrease in pressure of the nitrogen-rich stream relative to the compressed air stream, brings about an increase in the ratio of the partial pressure at the temperature in question of the impurity to the total nitrogen-rich stream pressure. The capacity of the nitrogen-rich product stream to contain the impurity is accordingly increased for the prevailing temperature difference, and the critical temperature difference is increased for the prevailing pressure ratios. Temperature and pressure, therefore, are primary variables that affect the evaporative conditions of reversing exchangers, the pressure ratio that favors evaporation of impurities and the temperature difference that may retard or hinder it.

In process arrangements as exemplified by Figure 1 of the drawing, the difference between the pressure of the compresed air stream and the pressures of the product streams usually are predetermined and established by the refrigeration and distillation requirements that are decided upon and fixed at the time the entire processing arrangement is initially designed. The pressure variable therefore has arbitararily become a fixed value. With this one of the competing influences involved in the evaporative operation of exchanger 10 thus fixed it becomes necessary only to operate the reversing gaseous streams of the heat exchange zone at temperature differences less than critical values determined according to the procedure heretofore outlined to achieve continuously the complete evaporation and removal of an impurity, such as carbon dioxide, in the interval of time between the change of settings of reversing valves 24 and 27.

A graph of these theoretical critical temperature differences between the compresed air and nitrogen-rich product streams at successive low temperatures is shown by lines A and B in Figure 2 for water and carbon dioxide respectively. Line A shows that relatively large differences in the temperatures between the compressed air and nitrogen-rich product streams are satisfactory for the evaporation and removal of water near the warm end of exchanger 10 but that the allowable difference between the temperatures for such action decreases towards the cold end of the exchanger. Similarly line B shows the same characteristics as line A but the graph for carbon dioxide starts at about —180° F. because this material first begins to precipitate from the compressed air at this low temperature. Line B is extended to about —280° F. since carbon dioxide is substantially completely precipitated from air kept in the vapor phase at this extremely low temperature by pressure conditions.

The foregoing temperature differences show the limiting conditions under which it is theoretically possible to achieve complete evaporation and removal of water and carbon dioxide impurities from exchanger 10. Hence, for the continuous operation of this exchanger for long periods of time, it becomes necessary only to operate the exchanger with difference between temperatures of the compressed air and nitrogen-rich product streams less than the differences exhibited by lines A and B of Figure 2. However, in reality the operating temperature differences actually obtained in exchanger 10 between the reversing compressed air and nitrogen-rich product streams as shown by line C of Figure 2 and these do not remain less than the limiting values of lines A and B over the whole length of the exchanger. Toward the cold end of this vessel the actual temperature differences indicated by line C are greater and cross above lines A and B, a fact which indicates quite clearly that exchanger 10 cannot operate without plugging by water, ice, and solid carbon dioxide. Such a phenomenon in connection with the temperature differences is derived from that fact that the specific heat of air at 90–100 pounds per square inch gauge is somewhat larger than the specific heat of air or of its components at atmospheric pressure. It is a known fact that the difference in specific heat, expressed on a molal basis, between the aforementioned pressures averages about 4% for the temperature range of the air passing through exchanger 10, but the difference is smaller at room temperature and increases more and more rapidly at the lower temperatures. Inasmuch as the mass rate of flow of the compressed air usually is equal to the mass rates of flow of all the product of the separation passing back through the exchanger, by means of a simple heat balance around exchanger 10 and knowing the relationships of the specific heat and temperature for the streams considered, the temperature difference relationship as shown by line C of Figure 2 is obtained. Thus, as a result of the phenomenon that the specific heat of air increases slightly above its value at atmospheric pressure, the temperature difference between the two reversing streams increases towards the cold end of the exchanger to values that make the exchanger inoperable. From the line C of Figure 2 it can be seen that this fact is independent of the temperature of the streams approaching and leaving the warm end of exchanger 10 because, even if the actual temperature difference between the compressed air and nitrogen-rich product were reduced to zero, the difference in temperature between these gases at the cold end of the exchanger would still remain at values greater than the critical value for complete evaporation of impurity at that point.

Referring again to Figure 1, to decrease the undesirably large and inoperable temperature differences between the reversing streams at the cold end of a reversing exchanger of the character of exchanger 10 and pursuant to a method described by Paul R. Trumpler, in his application Serial No. 533,608, now Patent 2,460,859, the cooled compressed air is withdrawn from exchanger 10, for example, from passageway 12 at —262° F. and about 90 pounds per square inch gauge. It is then conducted through line 33 and check valve manifold chamber 31 into line 34 through which it passes to either of the filters 35 or 36 for the purpose as hereinafter described. After the filtering step the cooled air is directed through line 37 for its subsequent treatment. A portion of the compressed air is separated continuously from the main stream thereof in line 37 and caused to pass through line 38 into the cold end of passageway 14 of exchanger 10 wherein it is passed continuously in countercurrent heat exchange relation with the compressed air stream flowing through either of the passageways 11 or 12 of the exchanger. As the result of this procedure, at any section of the exchanger including the passageway 14, the mass flow of "cold streams" exceeds the mass flow of the compressed air stream by an amount equal to the flow of the separated portion of the cool compressed air circulated through passageway 14. To emphasize the fact that the "cold streams" exceed the "warm stream" the term "unbalance" has been used and the stream of material in passage 14 has been designated the "unbalance stream."

The resultant effect of having a larger mass of cold streams is to tend to make the temperature differences between the compressed air stream and the nitrogen-rich product stream decrease toward the cold end of exchanger 10. By proper control of the flow of the unbalance stream it becomes possible to overcome the tendency of higher specific heat of the air to cause an increase of these temperature differences and indeed it is possible even to bring about as great a decrease as may be desired. Line D of Figure 2 shows the temperature differences obtained in the described process of the flow arrangement shown by Figure 1 when approximately 9% of the cool compressed air is separated from line 37 and circulated through passageway 14 which passageway extends in exchanger 10 in the region between about −70° F. and −262° F. of the exchanger. From Figure 2, therefore, it is seen that the actual temperature differences start considerably below the critical values expressed by lines A and B and then increase in the manner shown by line C until the additional heat exchange effect of the unbalance stream is reached at about −70° F. From this point, due to the additional mass of cold compressed air circulating through passageway 14, the actual temperature differences change in their trend at the split point s just under line A and become expressed by line D. This line has a negative slope due to the aforementioned effect of the unbalance stream to decrease the temperature differences toward the cold end of exchanger 10. By comparison with the allowable temperature differences expressed by lines A and B it is evident that the actual operating temperature differences between the compressed air and nitrogen-rich product streams are now below the theoretical critical values defined heretofore for carbon dioxide as illustrated by line B but cross above line A. However, exchanger 10 is capable of operating for long periods of time without plugging because line D falls above line A over the range of the latter line for that part of exchanger 10 which is so cold that only a very insignificant amount of water vapor could possibly be present in its vaporous phase. While the described method involves the use of a portion of the cool compressed air stream for unbalancing heat exchanger 10, it is understood, of course, that a portion of the cold nitrogen-rich product stream may be used instead, or portions of each of these cold streams may be simultaneously employed.

The flexibility of operating conditions available for controlling the character of the heat exchange relationship between the streams flowing through heat exchanger 10, in accordance with the "unbalance" principle, is limited to the change which can be made in the rate of mass flow through the unbalance passageway 14. Any change in this flow, however, occurs at the expense of a variable temperature approach to the end of the exchanger. Due to the above-mentioned continuous variation of the specific heat of air with temperature at any given pressure and to the resultant tendency of the actual operating temperature differences to be successively greater at lower temperatures, it becomes apparent that increasingly greater amounts of the "unbalance stream" necessarily must be employed in the lower temperature regions of the exchanger to maintain a constant value for the temperature differences. However, the critical values for the temperature differences for the complete evaporation and removal of the deposited higher boiling impurities, as depicted by lines A and B of Figure 2, not only do not remain constant but are decreasingly smaller at the lower temperatures and in consequence thereof, increasingly larger amounts of the unbalance stream become necessary to operate the exchanger within the critical range of the temperature differences. Hence, since these mentioned effects are accumulative effects, it has been the practice to operate the heat exchange zone by employing a rate of mass flow of the unbalance stream sufficient to provide a temperature difference at the extreme cold end thereof small enough to be less than the critical value depicted by line B of Figure 2 and to provide a slope to line D of the proper magnitude to cause this latter line to intersect line C at a "so-called" split point below the critical values expressed by line A. This method, while effective for obtaining the desired results, is not economical since it requires employment of longer passageways of an expensive type of heat exchange apparatus.

According to the method of the present invention the rate of mass flow of the unbalance stream is progressively increased toward the cold end, or conversely, is progressively decreased toward the warm end of the heat exchange zone in close relationship to the heat exchange requirement necessary to compensate for both the increase in the specific heat of air and the decrease in the critical temperature differences allowable for the complete evaporation and removal of deposited higher boiling components. This is accomplished by use of a "multiple unbalance" arrangement whereby it becomes possible to operate the colder section of the heat exchange zone at a larger effective mean temperature difference and yet at the same time to avoid operating above the theoretical critical temperature differences of carbon dioxide. The actual operating temperature differences obtained in the colder portion of heat exchanger 10 by employment of "multiple unbalance" are indicated by the segment lines $a$, $b$, and $c$ of line E of Figure 2. To operate exchanger 10 in accordance with the principle of "multiple unbalance" the portion of the cooled compressed air diverted from line 37 to passageway 14, by way of line 38, is increased from the aforementioned 9% to a quantity within the range of 34 to 47% of the volume of the stream in line 37. While the diverted air enters passageway 14 at the same temperature as before, i. e., −262° F. and thereby effects a temperature difference of about 7° F. as shown by the ordinate at the right end of segment line $c$, it is now permitted to flow in countercurrent heat exchange therein only for a short distance until the temperature thereof has increased to a value that establishes conditions to locate a point on the chart of Figure 2 slightly below the theoretical critical temperature difference for carbon dioxide, such as is illustrated by the left hand terminus of segment line $c$ of line E in Figure 2. At this point approximately 60% of the unbalance stream is withdrawn from passageway 14 through the withdrawal line 39. The remaining 40%, now representing about 13.5 to 19% of the cooled compressed air, is permitted to continue its passage through passageway 14 and in so doing establishes temperature differences between the warm and cold streams of the exchanger as are indicated by the segment line $b$ of line E. These temperature differences likewise are below the theoretical critical values for carbon dioxide. However, the slope of segment line $b$ is such that this second stage of flow of the unbalance stream would, if continued, create temperature differences too great for the complete evaporation and removal of water. Consequently about 20% of the initial quantity of air in line 38 next is withdrawn from passageway 14 through withdrawal line 40 and only the remaining last 20% of the initial stream from line 38 is permitted to complete its passage through passageway 14 for final withdrawal therefrom through line 41. From Figure 2 it can be seen that line C, representing the actual temperature difference obtained by the conditions of the present illustrative example, intersects line B at a point having coordinates of about $-200°$ F. for temperature of compressed air and 15° F. for the maximum allowable temperature difference between compressed air and nitrogen-rich product. Hence, the quantities of the unbalance stream withdrawn and the location of the points of withdrawal necessarily must be proper to keep segment line $b$ below line B and to terminate suitably so that the temperature difference between the compressed air and nitrogen-rich output product in the region of about $-200°$ F. is less than 15° F. The temperature difference relationship between the warm and cold streams in the exchanger over the last portion of passageway 14 is depicted by segment line $a$ of line E in Figure 2. This latter segment line has a terminal point at the "so-called" split point $s$ on line C. The resultant effect of this multiple unbalance arrangement not only is to accomplish actual operable temperature differences for exchanger 10 but does so in the present illustrative example with an approximate 20% decrease in the length of the colder portion of the exchanger. In this way a more efficient utilization of heat exchange surface is more economically obtained.

Returning now to the description of the process arrangement of Figure 1, as stated the cooled compressed air is withdrawn from exchanger 10 through line 34 to filter 35 or 36 at a temperature of $-262°$ F. From line 34 the air is passed through filter 35, for example, by way of line 42 having valve 43 positioned therein. Each filter contains a body of adsorbent material, such as granular particles of activated carbon or silica gel, the function of which is to filter out any solid particles or adsorb any vaporous impurity as a hydrocarbon or carbon dioxide which may have been carried thus far through the system. The filters are, of course, particularly advantageous in this respect during starting-up periods of operation before exchanger 10 is performing its full heat exchange function. The filtered air then leaves filter 35 by way of line 44, through valve 45, and is passed into line 37. At frequent intervals of time should filter 35 require regeneration, valves 43 and 45 are closed and valves 46 and 47 in lines 48 and 49 respectively are opened to divert the air from line 34 through filter 36. For the regeneration a part of the filtered air is diverted from line 37 through line 50 by opening valve 51 and, after being suitably warmed in heat exchanger 52, is passed through filter 35 by way of lines 53, 54, and 56, valves 57, 58, and 59 respectively being opened at this time. Filter 36 similarly may be regenerated by passing the warm air from line 53 into and out of this filter by way of lines 54, 55, and 56 respectively when valves 60 and 61 are open and valves 58 and 59 are closed. Valved line 62 serves as a bypass line around the filters.

According to the present illustrative operation, all portions of the unbalance stream leave passageway 14 and are commingled in line 41 to have a temperature at about $-220°$ F. and then are conducted therethrough to heat exchanger 63. A portion of this stream is withdrawn from line 41 through line 64, in an amount as controlled by valve 65, and introduced into a portion of the cold compressed air flowing in line 37 on the downstream side of valve 66. The commingled portions comprise a fraction representing about 15% of the feed air now adjusted by the commingling to a temperature of about $-236°$ F. which is suitable to prevent any condensation from occurring when this fraction is expanded in an engine to produce the cold requirements of the system. The remaining portion of the stream of air in line 41 is passed through valve 67 into heat exchanger 63. In this vessel it is brought into heat exchange with the cold nitrogen-rich product to be cooled thereby again to $-262°$ F. The portion thus cooled in heat exchanger 63 leaves this vessel through line 71 and is passed through valves 72 and 73 into line 70 and commingled therein with that portion of the cooled compressed air which is being passed directly from line 37 at $-262°$ F. to high pressure section 68 of fractionator 69. Valved lines 74, 75, and 76 are bypass lines which are utilized in instances where it becomes desirable or necessary to make temperature adjustments to the fluid streams in either line 37 or line 70. These bypass lines also are capable of being employed to regulate the temperatures of flowing streams during starting up periods.

The commingled stream of air in line 37 downstream from valve 66, having attained a temperature of $-236°$ F., is in condition for gaseous phase expansion. Before expansion, however, and particularly during starting up periods, in order to prevent water vapor from freezing in the expansion engine, valve 77 in line 78 is closed and the air for expansion is taken from line 37 into and out of dryer 79 by means of lines 80 and 81, valves 82 and 83 being open at this time. The drying medium may consist of any of the well-known agents, for example silica gel. When it is necessary to regenerate the drying medium in dryer 79, the vessel is taken off stream by closing valves 82 and 83 and opening valves 84 and 85 in lines 86 and 87 to permit the air to undergo drying in dryer 88. Valves 89 and 90 are open in lines 91 and 92 and warm air is drawn from line 53 through line 93 into line 95 in an amount regulated by valve 94. The warm air finally is taken into dryer 79 by means of lines 91 and 81 and after contact with the drying medium, is vented through lines 80, 92, and 96. The drying medium in dryer 88 likewise may be regenerated when this vessel is off stream by closing valves 84 and 85 and by directing the flow of warm air from line 91 through the then open valve 97 and into line 87. After contact with the drying medium in this vessel, the air is vented through line 86, valve 98 and lines 92 and 96.

In any event whether the portion of the air is dried or bypassed around the dryers through line 78, it is finally transferred to expander 99 by way of line 100. Valve 101 represents a solenoid valve responding to expander speed and shuts off the flow of air in the event the expander loses its load. The expander is connected cooperatively with an expander brake 102 that preferably is an electrical generator. During starting up periods or at times when expanded 99 is off stream, expander 103 is put into service as an auxiliary or spare apparatus and when in use the air enters this expander through line 104 and leaves by way of line 105 for transfer to line 106. The compressed air thus is expanded in the expansion step in the vapor phase and with the product of external work to a pressure of about 9 pounds per square inch gauge. This results in a lowering of its temperature to about −305° F. as the air finally is transferred through line 106 and introduced at an intermediate point into the low pressure section 107 of fractionator 69.

Returning now to the stream of air flowing through line 70 which represents about 85% of the cooled and purified air withdrawn from exchanger 10 through line 34, this stream is conveyed directly into the bottom section 68 of fractionator 69 through pressure control valve 108. It is the function of the fractionator to separate the air into oxygen-rich and nitrogen-rich products by rectification. For this purpose fractionator 69 is constructed with two compartments or sections. These sections operate at different pressures, the upper section 107 being under about 9 pounds per square inch gauge while the pressure in the lower section is about 89 pounds. The two sections are provided with suitable means for promoting a plurality of intimate vapor-liquid contacts which means may comprise fractionating trays 109 and 110 provided with bubble caps. A calandria type heat exchange device 111 is positioned between the two sections and is employed as the reflux condenser for the high pressure section while simultaneously being utilized as the reboiler for the low pressure section. The operating pressures within the two sections are selected so that the temperature of the condensing vapors in the top of the high pressure section 68 is sufficient to transfer from these vapors the heat necessary to boil the liquid bottom product of the low pressure section 107.

The cooled but vaporous air from line 70 is introduced into section 68, preferably at a temperature only slightly above its dew point, in the vapor space immediately under the bottom tray and the rising vapors therefrom are brought into contact with descending liquid reflux on the trays of this section. By maintaining a bottom temperature of −274° F. and a top temperature of −288° F. the air is fractionted roughly into two products. The liquid bottom product is oxygen-enriched air having an oxygen concentration of approximately 38% while the top product condensing within calandria 111 is essentially pure nitrogen. This top product is employed to supply liquid reflux for both sections 68 and 107. Valved lines 112, 112′ and 113 are drawoff lines in the event it becomes necessary to withdraw material from the fractionator at these points.

The liquefied oxygen-enriched air which accumulates in the base of section 68 is withdrawn therefrom in a regulated continuous stream through line 114 and thereafter passed through either of the filters 115 or 116. These filters contain beds of suitable filtering or adsorbing material such as silica gel or activated carbon and it is their function to remove any residual amounts of carbon dioxide or any other impurity for instance, actylene, which may be present in the liquefied air at this stage of the process. When filter 115 is on stream the liquid bottom product from section 68 passes from line 114 through connecting line 117 and valve 118 into the filter and after contact with the filtering material, leaves by way of connecting line 119 through valve 120. When filter 116 is employed the fluid stream from line 114 passes through connecting line 117 and valve 121 for contact with the filtering material and then leaves the filter by way of connecting line 119 through valve 122. For revivifying material in either filter 115 or 116, warm air is brought through line 93 into connecting line 123 and passed through either valve 124 or 125 into the vessel undergoing revivification. The spent air from the revivifying operation subsequently is vented through line 128 and line 129, either valve 126 or 127 being open depending upon which filter is being regenerated. The oxygen-enriched liquid after the filtration step is conveyed through line 130 to connecting line 131 wherein it is divided into two portions, one portion being passed through subcooler 132 while the other portion passes through subcooler 133. In these subcoolers, the two streams are further cooled to about −280° F. by heat exchange with streams of nitrogen-rich vapors from the subsequent separation. At this temperature vaporization of the oxygen-enriched liquid is minimized when the cooled streams leave the subcoolers through connecting line 134 and are taken through line 135 and expanded through valve 136 into low pressure section 107 of fractionator 69.

Simultaneously with the transfer of the oxygen-enriched liquid bottom product from high pressure section 68 to low pressure section 107, the liquefied substantially pure nitrogen top product also is withdrawn from the top tray 137 of the high pressure section and passed through line 138. The stream of this liquid product of the primary separation is likewise divided in connecting line 139 into two portions, these portions being further cooled in subcoolers 140 and 141 to about −308° F. by heat exchange with the nitrogen-rich vapors before these vapors next are passed in the above-mentioned heat exchange relationship with the oxygen-enriched liquid. When the thus cooled liquefied nitrogen leaves the subcoolers through connecting line 142 and are subsequently taken through line 143 and expanded through valve 144 into the top of section 107 of the fractionator, there is no excessive flashing of this material. Rectification of the expanded vaporous air from expander 99 and the components of the air expanded through valves 136 and 144 takes place on the vapor-liquid contacting trays in section 107. The liquid bottom product of this rectification, being substantially pure oxygen of not less than 95% purity, accumulates as a pool surrounding the tubes of calandria 111 at a temperature of about −288° F. Vaporization of this liquid by the condensing nitrogen vapors within the tubes of the calandria provide the reboiling vapors for section 107 and produce the product vapors of oxygen. The product vapors are removed from the fractionator through line 145 at a point above the liquid surface of the pool. These vapors are transferred through line 145 at a temperature of −288° F. to reversing heat exchanger 10 wherein they are conducted through passageway 13 in a countercurrent heat exchange with fresh supplies of incoming compressed air. Having thus given up their recoverable "cold" content to the air, the oxygen product vapors are withdrawn from exchanger 10 through line 146 at a temperature of about 83° F. and under an outlet pressure of approximately 3 pounds per square inch gauge.

The vaporous nitrogen-rich overhead product from fractionator 69 is withdrawn through lines 147 and 148 at a temperature of about —312° F. and immediately is brought into heat exchange in subcoolers 141, 140, 133, and 132 with the liquefied nitrogen and oxygen-enriched air. This exchange of heat warms these vapors to —278° F. by the time they are taken through connecting line 149 and line 150 to heat exchanger 63. The partially warmed nitrogen vapors take up further heat in this exchanger and are warmed to —267° F. when they finally pass through line 151 into the check valve manifold chamber 31. Valved line 152 is a bypass line around exchanger 63.

During the period of time when reversing valves 24 and 27 are set to cause the compressed air to flow through passageway 11 of exchanger 10 and to leave this passageway by way of line 32, the check valves within check valve manifold chamber 31 function to cause flow of the nitrogen vapors from line 151 through line 33 and passageway 12 of exchanger 10, wherein they take up heat by countercurrent heat exchange with the compressed air in passageway 11 and are warmed thereby to 83° F. The nitrogen-rich vapors then are withdrawn from exchanger 10 and from the system through lines 25 and 30, reversing valve 27 and line 28. During the opposite phase in the reversing operation of exchanger 10, that is, when reversing valves 24 and 27 are set to cause the compressed air to flow through passageway 12 and to leave the exchanger by way of line 33, the check valves automatically actuate themselves to permit the nitrogen-rich vapors to flow from line 151 through the check valve manifold chamber 31 into line 32 for passage through passageway 11. In this latter case the warmed nitrogen-rich vapors are withdrawn from the system through lines 26 and 29, reversing valve 27 and line 28.

As stated above, an alternative embodiment of the invention involves utilization of a portion of the outflowing cold nitrogen-rich product before passage through the exchanger, as the separate gaseous stream for passage through the separate path to obtain unbalance heat exchange and thereby decrease undesirably large and inoperable temperature differences between the reversing streams at the cold end of the exchanger. This embodiment is illustrated in Figure 3 in which parts identical in function to similar parts in Figure 1 are identified by the same reference numeral as in Figure 1, with a subscript $a$. In Figure 3, a portion of the nitrogen-rich product passes to the check valve manifold chamber 31$a$ through line 151$a$. In this arrangement line 38$a$ connects line 151$a$ with the inlet end of passageway 14$a$, line 41$a$ connects the exit of passageway 14$a$ with line 151$a$, and valve 152 is located in line 151$a$ between the points of withdrawal and return of the portion of the nitrogen-rich product passed through passageway 14$a$. By thus connecting lines 38$a$ and 41$a$ to line 151$a$ and locating valve 152 in this line, nitrogen-rich product is utilized for the unbalance stream in passageway 14$a$.

When precooling compressed air to a temperature sufficient to precipitate and deposit substantially all of the carbon dioxide impurity in the reversing heat exchange zone and employing a portion of the backward-returning nitrogen-rich product in passageway 14$a$, a preferred operation involves warming the portion of the air about to be expanded to a temperature that will provide for vapor phase expansion. In this event at least a part of the air passing through line 78$a$ is diverted through line 156 in an amount as controlled by valve 158 and passed through heat exchanger 63$a$. In the exchanger the diverted air is warmed by heat exchange with at least a portion of the unbalance stream returning from passageway 14$a$ through line 41$a$. The necessary amount of the unbalance stream is withdrawn from line 41$a$ and passed through line 154 to exchanger 63$a$. After heat exchange in exchanger 63$a$ the withdrawn portion is returned through line 155 to line 41$a$. Valve 153 is positioned in line 41$a$ between the connections of lines 154 and 155 therewith to control flow through line 154. The warmed compressed air leaves exchanger 63$a$ through line 157 and is returned to line 78$a$ on the downstream side of valve 158 for passage therethrough to the expansion step. The embodiment illustrated in Figure 3 operates otherwise in the same manner as that described in connection with Figure 1.

It is understood that the present invention is not limited to any of the embodiments described herein for illustrative purposes, nor to the specific separation of air as a gaseous mixture but only in and by the following claims.

I claim:

1. In a system for the separation of air by liquefaction and fractionation into output products in which a compressed stream of air, containing carbon dioxide as an impurity, is passed through a path in a reversing heat exchange zone and a stream of output product under lower pressure and temperature than the compressed air is passed through another path in said reversing heat exchange zone in heat exchange relation with the compressed air passing therethrough, and wherein the mass flow of both of said streams in said heat exchange zone are adjusted to regulate the temperature of the air sufficiently to effect in the colder portions therein substantially the complete precipitation and deposition of the carbon dioxide impurity, and further wherein a third gaseous stream obtained from the system after said precipitation of the carbon dioxide impurity is passed through a separate path in said heat exchange zone disposed in heat exchange relation with said colder portions of the first mentioned path; the improvement which comprises withdrawing portions of said last mentioned gaseous stream at a plurality of spaced points along said separate path between the inlet and outlet of the third stream regulating the portions withdrawn at each of said spaced points to progressively decrease the rate of mass flow of the third stream through the separate path and thereby control the mean temperature difference effected by the third stream between the stream of compressed air and the said stream of output product in said colder portions of the heat exchange zone wherein a temperature within the range from about —180° F. to about —280° F. prevails and carbon dioxide impurity is precipitated at a greater degree than would be effected by said third stream in the absence of withdrawal of said portions.

2. In the method of separating air wherein a compressed stream of air is passed in one direction of flow through a reversing heat exchange zone in heat exchange with counterflowing product fluid not greater in mass quantity than said compressed stream of air and at lower pressure along a path therein progressively decreasing in temperature from end to end to effect cooling of the air and resultant precipitation of an impurity in a colder portion of said path, wherein a second gaseous stream comprising at least a portion of said counterflowing fluid and substantially free of said impurity and at lower temperature than said colder portion is passed subsequently through the same path in the opposite direction of flow after the first stream has ceased flow therein, and wherein said cooled air stream is fractionated into at least two product fractions in a fractionating system comprising a fractionating zone, at least one stream of said cooled air passing to said fractionating zone and separate streams of product fractions flowing from said fractionting zone and further wherein the temperature of said colder portion of said path is controlled by passing through a separate path in heat exchange relation with at least a part of said colder portion of the first-mentioned path a separate cooling stream, obtained from the fractionating system, in countercurrent heat exchange with said compressed stream of air whereby by reason of the passage of the separate cooling stream through the separate path the compressed air is subjected to heat exchange at said part of said colder portion of the first-mentioned path with counterflowing cold fluid greater in mass quantity than said compressed stream of air to maintain a difference between the temperature at which said precipitation occurs at any point in said colder portion and the temperature at which said second gaseous stream flows past said point which is less than would exist but for the passage of said separate cooling stream through said separate path; the improvement which comprises withdrawing a portion of the separate cooling stream from the separate path at an outlet intermediately spaced between the inlet and outlet of the last-mentioned stream, controlling the rate of mass flow of the separate cooling stream in the separate path downstream from said intermediately spaced outlet by said withdrawal to modify the heat exchange of said part of said colder portion to maintain a difference between the temperature at which said precipitation occurs at any point in the colder portion and the temperature at which said second gaseous stream flows past said point larger than would be effected by the passage of the separate cooling stream in the absence of the withdrawal of said portion therefrom, then combining the portions of the separate cooling stream and returning the combined portions to the fractionating system.

3. In a method of treating air wherein a compressed stream of air is passed in one direction of flow through a reversing heat exchange zone in heat exchange relation with counterflowing product fluid of said treatment not greater in mass quantity than said compressed stream of air and at lower pressure along a path therein progressively decreasing in temperature from end to end to effect cooling of the air and resultant precipitation of an impurity in a colder portion of said path, wherein a second gasous stream comprising at least a portion of said counterflowing fluid and substantially free of said impurity and at lower temperature than said colder portion is passed subsequently through the same path in the opposite direction of flow after the first stream has ceased flow therein, and wherein a portion of said compressed stream of air after its passage through the heat exchange zone is diverted and passed as a separate cooling stream through a separate path in said heat exchange zone disposed in heat exchange relation with at least a part of said cold portion of the first-mentioned path in countercurrent heat exchange relation with said compressed stream of air whereby by reason of the passage of the separate cooling stream through the separate path the compressed air is subjected to heat exchange at said part of said colder portion of the first-mentioned path with counterflowing cold fluid greater in mass quantity than said compressed stream of air to maintain a mean difference between temperatures at which said precipitation occurs in said colder portion and temperatures at which said second gaseous stream flows past said colder portion which is less than would exist but for the passage of said separate cooling stream through said separate path; the improvement which comprises withdrawing a fractional part of the separate cooling stream through an outlet positioned between inlet and outlet of the diverted portion of the compressed stream of air to decrease the mass quantity of the diverted portion in the separate path downstream from the withdrawal outlet in heat exchange with the compressed air and thereby maintain said mean difference effected by passage of the diverted portion through the separate path larger than would be effected in the absence of withdrawal of the portion through said outlet in the separate path.

4. In a method of treating air wherein a compressed stream of air is passed in one direction of flow through a reversing heat exchange zone in heat exchange relation with counterflowing product fluid of said treatment not greater in mass quantity than said compressed stream of air and at lower pressure along a path therein progressively decreasing in temperature from end to end to effect cooling of the air and resultant precipitation of an impurity in a colder portion of said path, wherein a second gaseous stream comprising at least a portion of said counterflowing fluid and substantially free of said impurity and at lower temperature than said colder portion is passed subsequently through the same path in the opposite direction of flow after the first stream has ceased flow therein, and wherein a portion of said compressed stream of air after its passage through the heat exchange zone is diverted and passed as a separate cooling stream through a separate path in said heat exchange zone disposed in heat exchange relation with at least a part of said cold portion of the first-mentioned path in countercurrent heat exchange relation with said compressed stream of air whereby by reason of the passage of the separate cooling stream through the separate path the compressed air is subjected to heat exchange at said part of said colder portion of the first-mentioned path with counterflowing cold fluid greater in mass quantity than said compressed stream of air to maintain a difference between the temperature at which said precipitation occurs at any point in said colder portion and the temperature at which said second gaseous stream flows past said point which is less than would exist but for the passage of said separate cooling stream through said separate path;

the improvement which comprises withdrawing portions of the separate cooling stream at a plurality of successive points spaced along the separate path between the inlet and outlet of the last mentioned stream and regulating the portions thus withdrawn at each of said points to control the progressive decrease in the mass flow rate of the separate cooling stream through the separate path toward the warm end thereof.

5. The improvement according to the method of claim 3 wherein the withdrawn portions of the separate cooling stream are combined and the combined portions are mixed with cooled compressed air passing from the reversing heat exchange zone.

6. In a method of treating air wherein a compressed stream of air is passed in one direction of flow through a reversing heat exchange zone in heat exchange relation with counterflowing product fluid of said treatment not greater in mass quantity than said compressed stream of air and at lower pressure along a path therein progressively decreasing in temperature from end to end to effect cooling of the air and resultant precipitation of an impurity in a colder portion of said path, wherein a second gaseous stream comprising at least a portion of said counterflowing fluid and substantially free of said impurity and at lower temperature than said colder portion is passed subsequently through the same path in the opposite direction of flow after the first stream has ceased flow therein, and wherein a portion of said second gaseous stream before it enters said path is diverted and passed as a separate cooling stream through a separate path in said heat exchange zone disposed in heat exchange relation with at least a part of said colder portion of the first-mentioned path in countercurrent heat exchange relation with said compressed stream of air whereby by reason of the passage of the separate cooling stream through the separate path the compressed air is subjected to heat exchange at said part of said colder portion of the first-mentioned path with counterflowing cold fluid greater in mass quantity than said compressed stream of air to maintain a difference between the temperature at which said precipitation occurs at any point in said colder portion and the temperature at which said second gaseous stream flows past said point which is less than would exist but for the passage of said separate cooling stream through said separate path; the improvement which comprises withdrawing portions of the separate cooling stream at a plurality of successive points spaced along the separate path between the inlet and outlet of the last mentioned stream and regulating the portions thus withdrawn at each of said points to control the progressive decrease in the mass flow rate of the separate cooling stream through the separate path toward the warm end thereof.

7. The improvement according to the method of claim 6 wherein the withdrawn portions of the separate cooling stream are mixed with said second gaseous stream, then effecting said subsequent passage of the second gaseous stream in the opposite direction and over the precipitate and thereby causing the removal thereof.

8. In a process for fractionating a gaseous mixture containing a relatively high-boiling impurity by compressing said mixture, cooling said compressed mixture, and then expanding, liquefying and evaporating at least part of said mixture in a low temperature fractionating system, wherein an inflowing charge stream of compressed gaseous mixture enters said fractionating system through a reversing heat exchange zone in which said inflowing stream is cooled and in a cold part of which, high-boiling impurities are precipitated, and wherein an outflowing product stream leaves said system through said reversing heat exchange zone, absorbing heat and scavenging said precipitated high-boiling impurity by revaporization, said inflowing and outflowing streams being flowed countercurrently and alternately with each other through periodically reversing paths in a heat exchange relation in said reversing heat exchange zone, a method for preventing the excessive accumulation of said precipitated impurity in said cold part, which method includes the steps of: withdrawing a stream of cold gas from said fractionating system at a point subsequent to the precipitation of said impurity, and flowing said stream in an outflowing direction into a separate non-reversing path extending through at least said cold portion of said heat exchange zone, said non-reversing stream being introduced into said non-reversing path at a mass flow rate substantially greater than that required for preventing excessive impurity accumulation if said stream were passed in undiminished flow through the entire length of said non-reversing path; withdrawing portions of said non-reversing stream from said non-reversing path at a plurality of successively warmer points along said non-reversing path; and returning said portions comprising all of said non-reversing stream to said fractionating system.

9. In a process for fractionating a gaseous mixture containing a relatively high-boiling impurity by compressing said mixture, cooling said compressed mixture, and then expanding, liquefying and evaporating at least part of said mixture in a low temperature fractionating system, wherein an inflowing charge stream of compressed gaseous mixture enters said fractionating system through a reversing heat exchange zone in which said inflowing stream is cooled and in a cold part of which, high-boiling impurities are precipitated, and wherein an outflowing product stream leaves said system through said reversing heat exchange zone, absorbing heat and scavenging said precipitated high-boiling impurity by revaporization, said inflowing and outflowing streams being flowed countercurrently and alternately with each other through periodically reversing paths in a heat exchange relation in said reversing heat exchange zone, a method for preventing the excessive accumulation of said precipitated impurity in said cold part, which method includes the steps of: withdrawing a stream of cold gas from said fractionating system at a point subsequent to the precipitation of said impurity, and flowing said stream in an outflowing direction into a separate non-reversing path extending through at least said cold portion of said heat exchange zone, said non-reversing stream being introduced into said non-reversing path at a mass flow rate substantially greater than would be required for preventing excessive impurity accumulation if said additional stream were passed in undiminished flow through the entire length of said non-reversing path; withdrawing portions of said non-reversing stream from said heat exchange zone at successively warmer points along said non-reversing path to maintain a mass flow rate through said non-reversing path at a value sufficiently large to prevent said impurity accumulation, but less than a flow rate which would, if continued, create temperature differences too great for the evaporation of said impurity; diminishing the mass flow rate of said non-reversing stream in the warmer part of said non-reversing path to a value less than the flow rate which would be required in said non-reversing path to prevent excessive accumulation if a non-reversing stream were passed therethrough in undiminished flow; and returning said portions comprising all of said non-reversing stream to said fractionating system.

10. In a process for fractionating a gaseous mixture containing a relatively high-boiling impurity by compressing said mixture, cooling said compressed mixture, and then expanding, liquefying and evaporating at least part of said mixture in a low temperature fractionating system, wherein an inflowing charge stream of compressed gaseous mixture enters said fractionating system through a reversing heat exchange zone in which said inflowing stream is cooled and in a cold part of which, high-boiling impurities are precipitated, and wherein an outflowing product stream leaves said system through said reversing heat exchange zone, absorbing heat and scavenging said precipitated high-boiling impurity by revaporization, said inflowing and outflowing streams being flowed countercurrently and alternately with each other through periodically reversing paths in a heat exchange relation in said reversing heat exchange zone, a method for preventing the excessive accumulation of said precipitated impurity in said cold part, which method includes the steps of: withdrawing a stream of said compressed gaseous mixture at a point subsequent to the precipitation of said impurity, and flowing said stream in an outflowing direction into a separate non-reversing path extending through at least said cold portion of said heat exchange zone, said non-reversing stream being introduced into said non-reversing path at a mass flow rate substantially greater than would be required for preventing excessive impuritiy accumulation if said additional stream were passed in undiminished flow through the entire length of said non-reversing path; withdrawing portions of said non-reversing stream from said heat exchange zone at successively warmer points along said non-reversing poth to maintain a mass flow rate through said non-reversing path at a value sufficiently large to prevent said impuritiy accumulation, but less than a flow rate which would, if continued, create temperature differences too great for the evaporation of said impurity; diminishing the mass flow rate of said non-reversing stream in the warmer part of said non-reversing path to a value less than the flow rate which would be required in said non-reversing path to prevent excessive accumulation if a non-reversing stream were passed therethrough in undiminished flow; and returning said portions comprising all of said non-reversing stream to said fractionating system at a point upstream from said expansion step.

11. In a process for fractionating a gaseous mixture containing a relatively high-boiling impurity by compressing said mixture, cooling said compressed mixture, and then expanding, liquefying and evaporating at least part of said mixture in a low temperature fractionating system, wherein an inflowing charge stream of compressed gaseous mixture enters said fractionating system through a reversing heat exchange zone in which said inflowing stream is cooled and in a cold part of which, high-boiling impurities are precipitated, and wherein an outflowing product stream leaves said system through said reversing heat exchange zone, absorbing heat and scavenging said precipitated high-boiling impurity by revaporization, said inflowing and outflowing streams being flowed countercurrently and alternately with each other through periodically reversing paths in a heat exchange relation in said reversing heat exchange zone, a method for preventing the excessive accumulation of said precipitated impurity in said cold part, which method includes the steps of: withdrawing a stream of cold gas from said fractionating sytsem at a point subsequent to said expansion step, and flowing said stream in an outflowing direction into a separate non-reversing path extending through at least said cold portion of said heat exchange zone, said non-reversing stream being introduced into said non-reversing path at a mass flow rate substantially greater than would be required for preventing excessive impuritiy accumulation if said additional stream were passed in undiminished flow through the entire length of said non-reversing path; withdrawing portions of said non-reversing stream from said heat exchange zone at successively warmer points along said non-reversing path to maintain a mass flow rate through said non-reversing path at a value sufficiently large to prevent said impuritiy accumulation, but less than a flow rate which would, if continued, create temperature differences too great for the evaporation of said impurity; diminishing the mass flow rate of said non-reversing stream in the warmer part of said non-reversing path to a value less than the flow rate which would be required in said non-reversing path to prevent excessive accumulation if a non-reversing stream were passed therethrough in undiminished flow; returning said portions comprising all of said non-reversing stream to said fractionating system at a point downstream from the point at which said non-reversing stream was withdrawn; and discharging a stream comprised at least in part of said returned non-reversing stream from said fractionating system by way of said heat exchange zone.

GEORGE T. COOPER.

References Cited in the file of this patent

UNITED STATES PATENTS

| Number | Name | Date |
|---|---|---|
| 1,539,450 | Wilkenson | May 26, 1925 |
| 1,571,461 | Van Nuys | Feb. 2, 1926 |
| 2,460,859 | Trumpler | Feb. 8, 1949 |
| 2,513,306 | Garbo | July 4, 1950 |

FOREIGN PATENTS

| Number | Country | Date |
|---|---|---|
| 327,127 | Germany | Oct. 7, 1920 |
| 469,943 | Great Britain | Aug. 3, 1937 |

OTHER REFERENCES

Transactions American Institute of Chemical Engineers, volume 43, Number 2, pp. 69–73, February 1947, presented December 1–4, 1946, Air Purification In The Reversing Heat Exchanger.

Chemical Engineering, March 1947, pages 126 to 134.